United States Patent [19]
MacLeod

[11] Patent Number: 5,825,427
[45] Date of Patent: Oct. 20, 1998

[54] IMAGE DISPLAY SYSTEM

[76] Inventor: Kenneth J. MacLeod, 111 Fleurance, Laguna Niguel, Calif. 92677

[21] Appl. No.: 518,583

[22] Filed: Aug. 22, 1995

[51] Int. Cl.$^6$ ........................................................ H04N 7/01
[52] U.S. Cl. .......................................... 348/445; 348/913
[58] Field of Search .................................. 348/448, 445, 348/556, 913; 345/127, 128, 129, 130, 131

[56] References Cited

U.S. PATENT DOCUMENTS

| | | | |
|---|---|---|---|
| 4,734,772 | 3/1988 | Akiyama | 348/445 |
| 5,223,928 | 6/1993 | Hamada | 348/445 |
| 5,243,421 | 9/1993 | Nagata et al. | 348/445 |
| 5,489,952 | 2/1996 | Gove et al. | 348/448 |
| 5,491,512 | 2/1996 | Itakura et al. | 348/445 |

*Primary Examiner*—Richard A. Hjerpe
*Assistant Examiner*—Ricardo Osorio
*Attorney, Agent, or Firm*—Drummond & Duckworth

[57] ABSTRACT

The present invention addresses problems of dealing with video formats in both 4:3 and 16:9 aspect ratios by providing an image display system having an aspect ratio between the 4:3 aspect ratio of the standard National Television System Committee (NTSC) and the soon to be implemented 16:9 aspect ratio of High Definition TV (HDTV). In a first embodiment, the apparatus utilizes a video screen having a substantially rectangular configuration having an aspect ratio being between 1.4:1 and 1.7:1. In a more preferred embodiment, the image display system includes a video screen having an aspect ratio being between 1.5:1 and 1.6:1. In an even more preferred embodiment, the video screen of the image display system optimally has an aspect ratio of (square root of 64/27):1.0.

4 Claims, 2 Drawing Sheets

IMAGE DISPLAY SYSTEM

BACKGROUND

The invention relates to the field of video broadcasting. More particularly, the invention relates to the soon to be implemented change from the present 4:3 aspect ratio of the National Television System Committee (NTSC) most prevalently used for television and the soon to be implemented 16:9 aspect ratio of future systems.

The NTSC television system is presently used as the standard color television system in the USA and several other countries. The NTSC system includes 525 horizontal scan lines typically received in a frequency band of 4.2 MHz to produce a video format having an aspect ratio of 4:3. Hereinafter, the aspect ratio is defined as the ratio of the horizontal length of a displayed image as a ratio to the vertical length of a displayed image (horizontal:vertical). Additional present day systems include PAL and SECAM systems that also utilize a 4:3 aspect ratio. Unfortunately, the 4:3 aspect of television conflicts with the wide format display aspect ratio of 16:9 corresponding to the display aspect ratio of theatrical movies. This has continued to create problems for both the television and cinematic industries which must process the video images prior to their transition from theater to home television, often resulting in a loss of video information. Conventionally, if a video image having an aspect ratio of 16:9 is shown on a screen of 4:3, the ends of the scanning lines are removed in the horizontal direction, expansion of the video signal in the vertical direction, or the video signal is displayed without any processing. This results in the loss of video information, the distortion of the video signal by expansion of the vertical direction or the inclusion of blank portions appended to the top and bottom sides of the video image.

Partly in order to resolve this problem both Japan and the United States have begun to study a new television system, a High Definition TV (HDTV). One of the characteristic features of the proposed HDTV systems is that the number of scan lines up to 1125 and the signal bandwidth is 20 MHz or wider, which has information capacity of about five times as large as the present system. Another characteristic feature of HDTV is that the aspect ratio of the proposed screen is 16:9, identical to that of cinematic productions. Furthermore, other television systems are also under study, including Enhanced TV (EDTV) and a second generation (EDTV-II), which also employ a 16:9 aspect ratio.

Widespread use of video image formats of 16:9 are expected to come into practical use in the near future, while continuing to use the presently used NTSC 4:3 aspect ratio. Accordingly, for the next several years, video material will be provided in one of two primary formats: the traditional 4:3 (1.333:1) aspect ratio, or the new HDTV or EDTV aspect ratio of 16:9 (1.778:1). In order to optimally display one of the types of video material using the full screen, it is anticipated most video display systems will be constructed with an aspect ratio of either 4:3 or 16:9. If broadcast signals of various systems are all to be received, several television receivers are required to be newly bought and installed, which is not practical from the aspects of expense and space.

To overcome these obstacles, image display systems have been developed that will display both the NTSC system, including 525 horizontal scan lines and frequency band of 4.2 MHz, and the HDTV and EDTV systems having 1125 scan lines and a frequency band of 20 MHz. For example, U.S. Pat. No. 5,218,436 discloses a television signal processing circuit capable of receiving television signals of different systems with a single television receiver by discriminating the input television signal and selecting a proper signal processing circuit.

Unfortunately, the display of 4:3 video material on a 16:9 screen or the display of 16:9 video material on a 4:3 leaves a substantial amount of unused screen that is not only inefficient but is substantially annoying to a person viewing the video image. As shown in FIG. 4, the display of 16:9 video material on a 4:3 screen leaves the top and bottom 25% of the screen unused. Similarly, as shown in FIG. 5, the display of 4:3 video material on a 16:9 screen leaves 25% of the left and right portions of the screen unused. Not only does this result in the ineffective use of the video screen but the constant display of video in the middle portions of the screen while the sides, top and bottom are only temporally used, results in uneven degradation of the cathode ray tube.

In order to overcome these problems, several additional image display systems have been devised. For example, as disclosed in U.S. Pat. No. 4,670,784, the blank portions are fixed in a mid-gray to decrease the unevenness of the degradation in those areas of the cathode ray tube. Similarly, U.S. Pat. No. 5,193,006 discloses displaying the unused portions at an average of the brightness of the entire video area. Unfortunately, each of these systems result in the display portion appearing rather small in comparison to the screen. In a somewhat compromising system, U.S. Pat. No. 5,386,236 discloses a combination of clipping and distorting the received image that results in a display that is substantially fatter than originally received. Additional systems that have been developed to adapt 4:3 and 16:9 aspect ratios include displaying the image on the left portion of the screen while providing character data on the right portion of the screen (U.S. Pat. No. 5,170,256), providing the viewer with a switch for the viewer to decide whether to crop, distort or provide shaded panels on the screen (U.S. Pat. No. 5,243,421) and providing the viewer with a joystick for the viewer to pan back and forth along the display in order to view the portion of the image most desired (U.S. Pat. No. 4,953,025).

Unfortunately, the wide variety of systems that have been developed to combine the 4:3 and 16:9 aspect ratios into a single system dramatically expose the struggle that the industry has encountered to resolve these incompatibility problems. Accordingly, it would be advantageous to have an improved image display system that displayed images presented in both the 4:3 and 16:9 aspect ratios.

Further, it would be advantageous to have an image display system that displayed 4:3 and 16:9 images with a minimum of non-information border area being displayed on the screen.

Moreover, it would be desirable to have an image display system that reduced or completely eliminated the need to clip or distort the image prior to display to completely fill the video screen.

SUMMARY

The present invention addresses the aforementioned disadvantages by providing an image display system having an aspect ratio between the 4:3 aspect ratio of the standard National Television System Committee (NTSC) and the soon to be implemented 16:9 aspect ratio of High Definition TV (HDTV). In a first embodiment, the apparatus utilizes a video screen having a substantially rectangular configuration having an aspect ratio being between 1.4:1 and 1.7:1. In a more preferred embodiment, the image display system includes a video screen having an aspect ratio being between 1.5:1 and 1.6:1. In an even more preferred embodiment, the video screen of the image display system optimally has an aspect ratio of the square root of 64/27 (1.54):1.0.

By providing an image display system with an aspect ratio of 1.54:1.0, creates an adaptive video system optimally suitable for receiving video signals having aspect ratios of both 4:3 and 16:9.

An additional advantage of the present invention is that the image display system does not require complicated and expensive processing units to adapt a 4:3 formatted video signal to a 16:9 video screen or to adapt a 16:9 formatted video signal to a 4:3 video screen.

Moreover, the image display system reduces or completely eliminates the need to clip or distort the video image prior its to display to completely fill the video screen.

Other features and advantages of the present invention will be appreciated by those skilled in the art upon reading the detailed description which follows with reference to the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
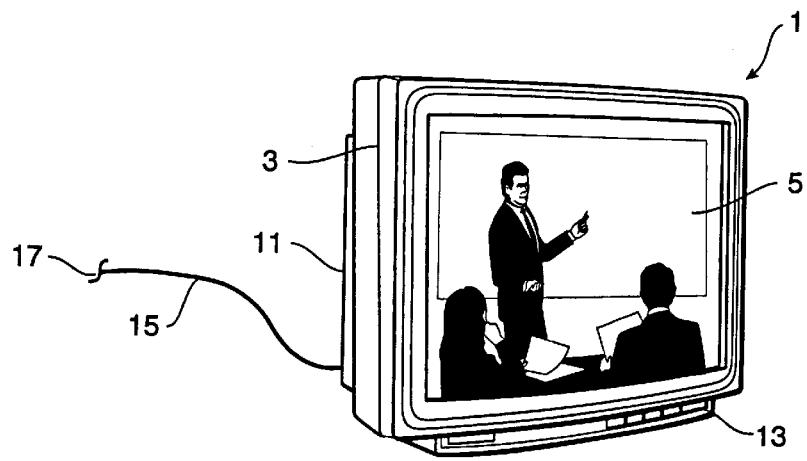
FIG. 1 is an isometric view of the image display system of the present invention.

While the present invention is susceptible of embodiment in various forms, there is shown in the drawings and will hereinafter be described a presently preferred embodiment of the invention, with the understanding that the present disclosure is to be considered as an exemplification of the invention, and is not intended to limit the invention to the specific embodiment illustrated.

Figure 2:
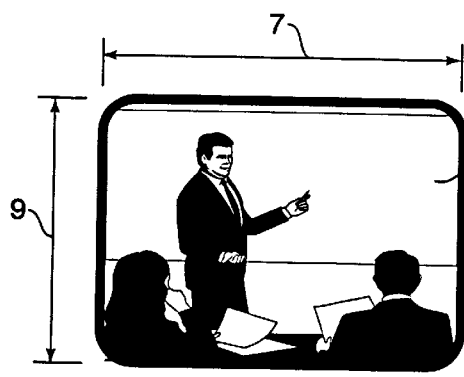
FIG. 2 is a frontal view of the video screen of a prior art image display system having a 4:3 aspect ratio.
Figure 3:
FIG. 3 is a frontal view of the video screen of the soon to be implemented image display systems having a 16:9 aspect ratio.

As shown in the exemplary drawings where like numerals represent like elements, the invention is embodied in an image display having an aspect ratio between the presently employed 4:3 ratio and the soon to be implemented in 16:9 ratio. As would be well understood by those in the art, the present invention is not limited to a typical television system as shown, but may include theatrical screens, rear projection systems, computer monitors and the like. Referring to FIG. 1, a typical prior art image display system 1 and exemplary of the image display system of the present invention is shown to include a cabinet housing 3, a video screen 5, a video image processor 11, a control panel 13 and an input lead 15. With reference to FIGS. 1, 2 and 3, typically the video screen 5 is positioned in the cabinet housing 3 to provide a substantial planar vertically extending surface having a horizontal dimension 7 and a vertical dimension 9 for displaying a video image. Connected to the video screen 5 is the video image processor 11 for processing input signals 17 received from the input lead 15 for producing an image on the video screen. Also, as would be readily understood by those in the art, the input lead 15 is depicted as a cable, typically used by television consumers; however, the input lead 15 is representative of any signal receiver for receiving a signal image such as an antenna or satellite dish.

With continued reference to FIGS. 1 and 2, video material is presently displayed on a screen having an 4:3 aspect ratio of the horizontal dimension 7 to the vertical dimension 9. This corresponds the standard NTSC system which includes 525 horizontal scan lines received in a frequency band of 4.2 MHz. As shown in FIG. 3, in the next few years video material will be provided in an aspect ratio of 16:9 of the horizontal dimension 7 and vertical dimension 9 corresponding to the proposed HDTV system or the like having up to 1125 scan lines and a signal bandwidth is 20 MHz. As a result, video material will be provided in one of two primary formats, the traditional 4:3 aspect ratio or the 16:9 aspect ratio, and video displays will be constructed with an aspect ratio of either 4:3 or 16:9 in order to optimally display one of the types of video material using the entire screen.

Figure 4:
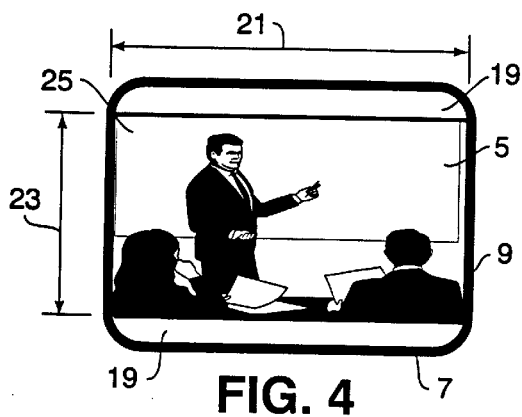
FIG. 4 is a frontal view of the video screen of a prior art image display system having a 4:3 aspect ratio displaying a video image having a 16:9 aspect ratio.
Figure 5:
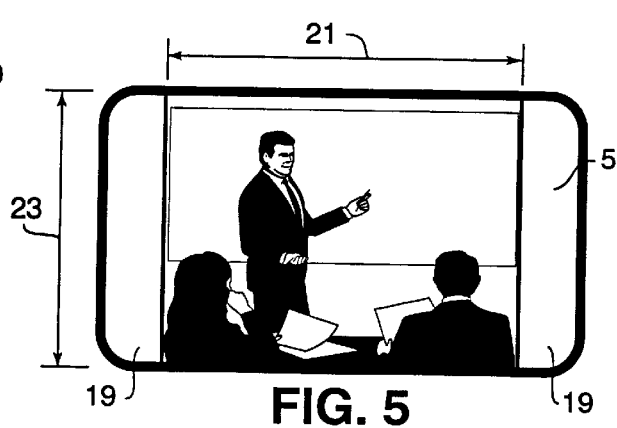
FIG. 5 is a frontal view of the video screen of the soon to be implemented image display systems having a 16:9 aspect ratio displaying a video image having a 4:3 aspect ratio.

As shown in FIGS. 4 and 5, with the construction of a screen having either aspect ratio, the display of the other type of video material thereon will only utilize 75% of the available area of the screen due to incompatible aspect ratios. For example, FIG. 4 shows the display of an image 25 having a 16:9 aspect ratio on a video screen having an aspect ratio of 4:3. The horizontal dimension 21 of the image extends the horizontal length 7 of the screen; however, the vertical dimension 23 of the image is substantially less than the vertical dimension of the screen 9 resulting in two unused screen portions 19 comprising 25% of the entire screen area. Similarly, as shown in FIG. 5, the display of an image 25 having a 4:3 aspect ratio on a video screen having an aspect ratio of 16:9 will result in two unused screen portions 19 at the sides of the screen also comprising 25% of the entire screen area.

The invention proposes an intermediate aspect ratio for video display screens which will minimize the worst-case portion of unused screen area during the period that display formats transition from the 4:3 aspect ratio to the 16:9 aspect ratio. It has been determined that there is a mathematically defined range of aspect ratios for achieving this result. In a first embodiment, the video screen of the present invention has a substantially rectangular configuration having an aspect ratio being between 1.4:1 and 1.7:1 thereby eliminating a substantial portion of the unused screen area. In a more preferred embodiment, the image display system includes a video screen having an aspect ratio being between 1.5:1 and 1.6:1. It has been determined that the optimum aspect ratio for minimizing the unused display area when supporting either 4:3 or 16:9 formats of the video material is the geometric mean between the two ratios. In other words, the optimum aspect ratio is the square root of (4/3×16/19) which is equal to the square root of 64/27.

Accordingly, in the preferred embodiment, the image display system includes a video screen having an aspect ratio of approximately 1.54:1.

Figure 6:
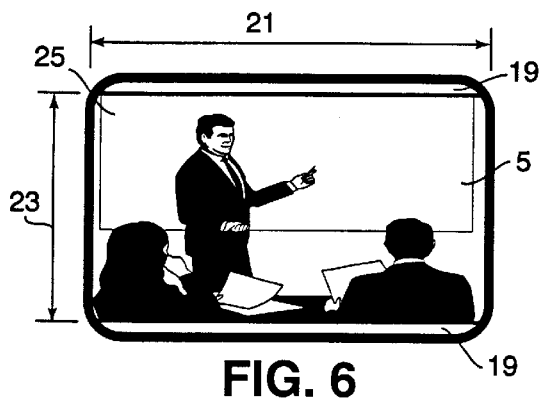
FIG. 6 is a frontal view of the video screen of the present invention having a 1.54:1 aspect ratio displaying a video image having a 16:9 aspect ratio.
Figure 7:
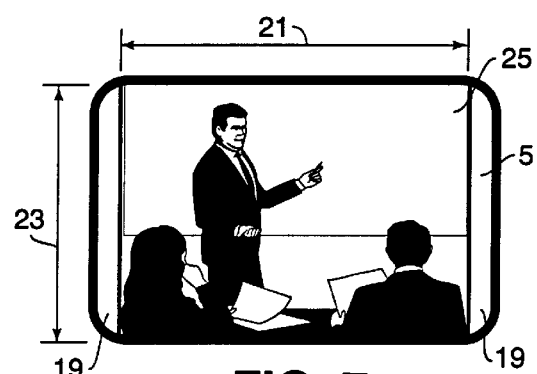
FIG. 7 is a frontal view of the video screen of the present invention having a 1.54:1 aspect ratio displaying a video image having a 4:3 aspect ratio.

As shown in FIG. 6, the display of a video image 25 having a 16:9 aspect ratio on a video screen 5 of the present invention including a 1.54:1 aspect ratio produces virtually insignificant unused screen portions 19 that would not destroy any of the information of the video image or detract from the viewer's enjoyment. The utilization of a video screen having a 1.54:1 aspect ratio to display an image having a 16:9 results in 86.6% of the screen being used and, accordingly, only an unused portion of 13.4%. Likewise, as shown in FIG. 7, the use a screen having an aspect ratio of 1.54:1 to display an image having a 4:3 format also results in insignificant unused screen portions 19 that also comprise only 13.4% of the screen or 86.6% of the screen being used. The percentage of utilization is identical for either format resulting in exceptionally high utilization.

Moreover, the present invention is ideally suited for the use of "overscan." The control of the size of a video image changes with time in most image display systems due to the degradation of circuit components. Accordingly, the video image has a tendency to shrink over time creating an unused border around the video image similar to the unused border area discussed above. In order to eliminate this unsightliness, the processor of the image display system is adjusted prior to integration with the system to "overscan" the received input signal to oversize the video image by 5%–10%. This results in an oversized image, an unnoticeable loss of the edge portion of the image which diminishes as the video image shrinks over time, and the elimination of the border created due to image shrinkage.

Figure 8:
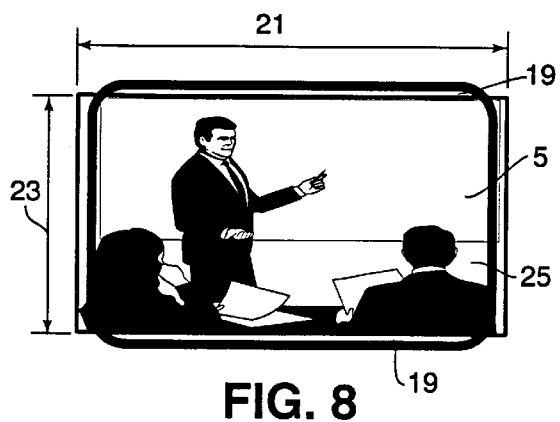
FIG. 8 is a frontal view of the video screen of the present invention having a 1.54:1 aspect ratio displaying an over-scanned video image having a 16:9 aspect ratio.
Figure 9:
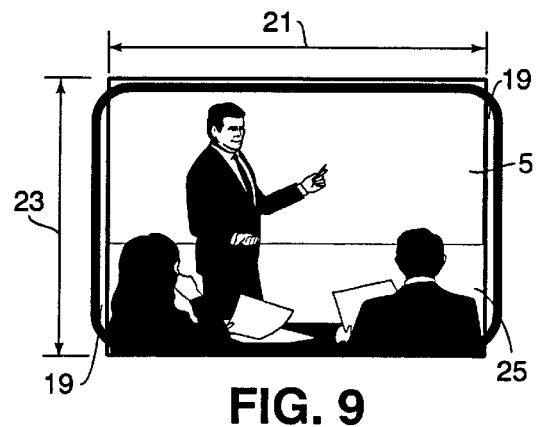
FIG. 9 is a frontal view of the video screen of the present invention having a 1.54:1 aspect ratio displaying an over-scanned video image having a 4:3 aspect ratio.

With reference to FIGS. 8 and 9, the use of a 5%–10% overscan, as is typically used in present systems, to an image display system having a screen with a 1.54:1 aspect ratio will result in the utilization of 91%–95% of the video screen. For example, as shown in FIG. 8, the display of an image 25 having a 16:9 format on a screen 5 having a 1.54:1 aspect ratio, will result in insignificant unused border areas 19 at the top and bottom of the screen. Similarly, as shown in FIG. 9, the display of an image 25 having a 4:3 format on a screen 5 having a 1.54:1 aspect ratio, will result in insignificant unused border areas 19 at the sides of the screen. In either instance, the formats will utilize 91%–95% which would be very satisfactory to viewers. Furthermore, though not necessary, for the practice of this invention it is anticipated that the image display system of the present invention could be combined with prior art systems which clip and distort the image and the like to eliminate any border area seen by the viewer.

Although the present invention has been described with reference to the preferred embodiment, workers skilled in the art will recognize that changes may be made in form and detail without departing from the spirit and scope of the invention. Having identified the presently preferred best mode thereof.

I claim:

1. An image display system for displaying a video image having an aspect ratio of either 4:3 or 16:9, the image display system comprising:

a video screen having a substantially rectangular configuration forming an aspect ratio of the horizontal dimension of said video screen to the vertical dimension of the said video screen, said aspect ratio being between 1.4:1 and 1.65:1;

a first image producing means for producing an image originally formatted with an aspect ratio of 4:3 on said video screen having an aspect ratio between 1.4:1 and 1.65:1; and a second image producing means for producing an image originally formatted with an aspect ratio of 16:9 on said video screen having an aspect ratio between 1.4:1 and 1.65:1.

2. An image display system of claim 1 wherein:

said aspect ratio is between 1.5:1 and 1.6:1.

3. An image display system for displaying a video image comprising:

a video screen having a substantially rectangular configuration forming an aspect ratio of the horizontal dimension of said video screen to the vertical dimension of said video screen, said aspect ratio being between 1.45:1 and 1.60:1.

4. An image display system for displaying a first video image having a first aspect ratio or a second video image having a second aspect ratio, the image display system comprising:

a video screen having a rectangular configuration forming a third aspect ratio, said third aspect ratio being substantially equal to the geometric mean of said first aspect ratio and said second aspect ratio;

a first image producing means for producing an image originally formatted with said first aspect ratio; and a second image producing means for producing an image originally formatted with said second aspect ratio.

* * * * *

(12) EX PARTE REEXAMINATION CERTIFICATE (9521st)
United States Patent
MacLeod

(10) Number: US 5,825,427 C1
(45) Certificate Issued: Feb. 22, 2013

(54) IMAGE DISPLAY SYSTEM

(75) Inventor: Kenneth J. MacLeod, Laguna Niguel, CA (US)

(73) Assignee: OGMA LLC, Longview, TX (US)

Reexamination Request:
No. 90/011,741, Jun. 13, 2011

Reexamination Certificate for:
Patent No.: 5,825,427
Issued: Oct. 20, 1998
Appl. No.: 08/518,583
Filed: Aug. 22, 1995

(51) Int. Cl.
*H04N 5/44* (2006.01)
(52) U.S. Cl. .................. 348/445; 348/913; 348/E5.111
(58) Field of Classification Search ................. None
See application file for complete search history.

(56) References Cited

To view the complete listing of prior art documents cited during the proceeding for Reexamination Control Number 90/011,741, please refer to the USPTO's public Patent Application Information Retrieval (PAIR) system under the Display References tab.

*Primary Examiner* — Roland Foster

(57) ABSTRACT

The present invention addresses problems of dealing with video formats in both 4:3 and 16:9 aspect ratios by providing an image display system having an aspect ratio between the 4:3 aspect ratio of the standard National Television System Committee (NTSC) and the soon to be implemented 16:9 aspect ratio of High Definition TV (HDTV). In a first embodiment, the apparatus utilizes a video screen having a substantially rectangular configuration having an aspect ratio being between 1.4:1 and 1.7:1. In a more preferred embodiment, the image display system includes a video screen having an aspect ratio being between 1.5:1 and 1.6:1. In an even more preferred embodiment, the video screen of the image display system optimally has an aspect ratio of (square root of 64/27):1.0.

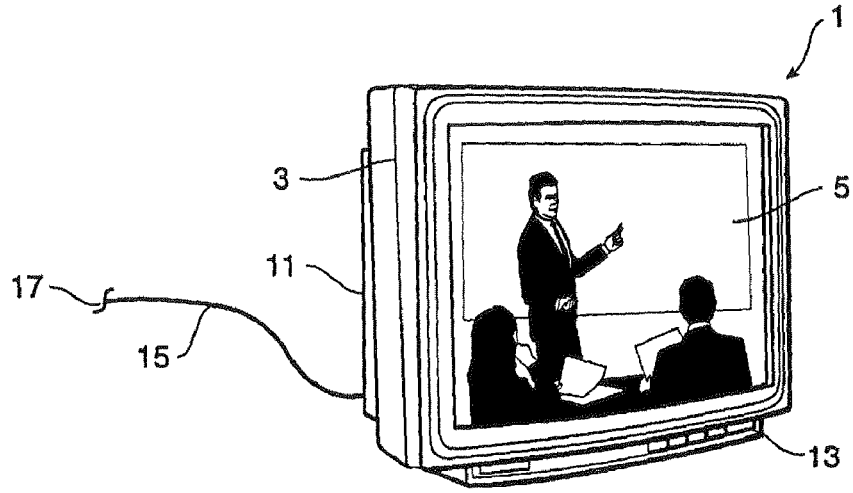

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-4 are cancelled.

* * * * *